United States Patent [19]
Lahti

[11] Patent Number: 6,159,376
[45] Date of Patent: *Dec. 12, 2000

[54] LAUNDROMAT WASTEWATER TREATMENT

[75] Inventor: William J. Lahti, Stony Brook, N.Y.

[73] Assignee: I.P. Licensing, Inc., Bohemia, N.Y.

[*] Notice: This patent is subject to a terminal disclaimer.

[21] Appl. No.: 09/151,989

[22] Filed: Sep. 11, 1998

Related U.S. Application Data

[63] Continuation-in-part of application No. 08/805,881, Mar. 3, 1997, Pat. No. 5,807,487.

[51] Int. Cl.$^7$ .................................................. C02F 1/42
[52] U.S. Cl. ..................... 210/665; 210/683; 210/723; 210/726; 210/266; 210/269
[58] Field of Search ................................ 210/665, 667, 210/683, 709, 723, 724, 726, 266, 269

[56] References Cited

U.S. PATENT DOCUMENTS

| | | | |
|---|---|---|---|
| 4,145,281 | 3/1979 | Weishaar et al. | 210/37 B |
| 4,182,676 | 1/1980 | Casolo | 210/27 |

*Primary Examiner*—David A. Simmons
*Assistant Examiner*—Betsey Morrison Hoey
*Attorney, Agent, or Firm*—Lackenbach Siegel

[57] ABSTRACT

A method and apparatus for the treatment of wastewater effluent from a laundromat combines multiple filtering, particularly including, bag filters, to remove particulates including fine particulates followed by treatment in a weak base anion exchange resin bed to remove MBAS. The weak base resin was found to remove MBAS and organics such as LAS which were highly de-adsorbed in the efficient regeneration of the resin. The weak base anion exchange resin is preferably macroporous in the sulfate form. The invention contemplates multiple bag filters of different degrees of coarseness.

14 Claims, 4 Drawing Sheets

LAUNDROMAT WASTEWATER TREATMENT

The present invention is a continuation-in-part of U.S. application Ser. No. 08/805,881 filed on Mar. 3, 1997 now U.S. Pat. No. 5,807,487, issued Sep. 15, 1998.

BACKGROUND OF THE INVENTION

1. Field of the Invention

The present invention relates to the treatment of wastewater, particularly wastewater effluent from household laundered wash or laundromats, as distinct from commercial laundry effluent.

2. Background and Discussion of the Prior Art

Laundromats desire to discharge their effluent to subsurface aquifers, or to the surface, or reuse the treated water as feedwater. Present day state and local environmental restrictions place severe limitations on the organic matter and solids permitted to be discharged to the environment. Laundromats desire an effluent treatment system which meets these present day rigorous environmental standards and yet permits essentially continuous operation with minimal downtime, and in which maintenance is achieved in a practical manner with minimal cost by persons of limited technical skill.

Environmental agencies in various locales throughout the country have recently set and enforced rigorous maximum discharge criteria standards for commercial wastewater. Laundromats in certain locales face the following wastewater effluent maximum permissible criteria:

| | |
|---|---|
| MBAS | 1.0 ppm |
| TSS | 30.0 ppm |
| TDS | 1000 ppm |
| Oil and grease | 15 ppm |
| pH | 6.5–8.5 |

"MBAS" refers to "methylene blue active substances", "TSS" refers to "total suspended solids", and "TDS" refers to "total dissolved solids", as determined by conventional testing methods well-known to those skilled in the art. "FOG" refers to "fats, oils and greases." "Oil and grease" is understood to mean essentially "FOG".

Laundromats face a particularly onerous burden in meeting the aforesaid criteria insofar as a typical laundromat effluent discharge is between 8,000 to 35,000 gallons/day and has the following broad range of characteristics:

| | |
|---|---|
| MBAS | 35–130 ppm |
| TSS | 70–130 ppm |
| TDS | 350–775 ppm |
| Oil and grease | 30–80 ppm |
| pH | 8.5–11.0 |

Commercial laundries, in contradistinction to laundromats, select and closely control the specific detergent and concentrations of same. Laundromats however are faced with the users' diverse detergents used in diverse concentrations. It has been found, by way of example, that detergent concentrations in the effluent are greater on weekends than on weekdays, and detergent materials and concentrations vary from moment to moment. Laundromats for the above and further reasons discussed infra have effluent discharge problems not generally faced in commercial laundry controlled operations.

One early attempt directed to a car wash or laundry effluent treatment is disclosed in U.S. Pat. No. 4,104,164, granted Aug. 1, 1978, to Chelton. Chelton disclosed a generalized approach to wastewater treatment. Chelton provided for a first stage treatment by a weir or gravity filtration of the effluent followed in seriatim by centrifugation, activated carbon adsorptive filtration, bag filtration and particulate filtration. Insofar as laundromat effluent particulates have a density close to that of water, the Chelton gravity filtration and centrifugation would effectively be inoperable for such use. It is doubtful that the Chelton system would be practical for laundromats, and could with any practical consistency ever meet the present stringent discharge standards before requiring extensive downtime and maintenance. Furthermore, by way of example, due to the types and concentration of contaminants present in laundromat wastewater, the Chelton activated carbon would be exhausted in a short period of time, necessitating extensive labor and expense to change the carbon bed. Other commercial laundry prior art systems were also directed to gravity and screens with oil/water separators as disclosed in U.S. Pat. No. 5,207,922, granted May 4, 1993, to McFarlan, et al. and U.S. Pat. No. 5,167,829, granted Dec. 1, 1992, to Diamond, et al. The treated 1992, to Diamond, et al. The treated water from these commercial laundry operations was generally discharged for further treatment at publicly owned treatment works.

U.S. Pat. No. 5,246,560, granted Sep. 21, 1993, to Dobrez, et al. disclosed a commercial laundry water treatment to remove FOGs in which a cationic coagulant is fed inline with monitoring of the electric charge value of the water-coagulant mixture. The treated water was like the afore-described prior art required to be transported to and further treated by publicly owned treatment works. This approach is not suitable for laundromats which must remove all requisite contaminants to satisfy the present environmental standards. German Patent No. 3,344,275, discussed in Dobrez, et al., disclosed a related method which required measuring diverse parameters of raw laundry wastewater and adding flocculent in response to cloudiness and adding alkali and/or acid in response to the measured pH value, with the pH of the wastewater adjusted to 7.5–9. These prior art treatment methods were unsuitable for laundromat operations or otherwise directed away from the present invention.

Commercial laundries may use amphoteric dicarboxylate amine based emulsifying detergents. Such detergent use is disclosed in U.S. Pat. No. 5,167,829, granted Dec. 1, 1992, to Diamond, et al. and U.S. Pat. No. 5,523,000, granted Jun. 4, 1996, granted to Falbaum, et al. Falbaum, et al. disclosed an organic soil removal method which employs a cationic flocculent in necessary operative combination with an amphoteric dicarboxylate detergent in a pH change protocol. Household, as opposed to commercial, laundry detergents and builders avoid such amphoteric dicarboxylate detergents because as amine derivatives they are subject to chelating with heavy metal compounds to form solubilized toxic materials. This is particularly so where the laundromats desire to recycle all or part of the treated effluent. Falbaum, et al., by virtue of requiring amphoteric dicarboxylates and creating such heavy metal toxicity, is inoperative for laundromat operations. See U.S. Pat. No. 3,870,648, granted Mar. 11, 1975, to Grifo at col. 3, lines 3–27 and col. 4, lines 9–15, for a discussion of this heavy metal toxicity problem in household laundered wash. The present invention avoids the introduction and use of toxic heavy metal chelating or solubilizing compounds such as amphoteric carboxylates which as amine derivatives chelate and solubilize toxic heavy metals. As a consequence, the treated water of the present invention is substantially free of toxic heavy metals, and may therefore be recycled to the laundromat or discharged to the environment.

The commercial laundry prior art, namely Falbaum, et al. and Diamond, et al., disclosed FOG separation or flocculation at exceptionally low pH values of about 1.5 to 4.5 in order to remove substantial FOGs to where the wastewater had a FOG concentration of about 100 ppm or lower. In marked contrast, laundromats require wastewater discharge with oil and grease concentrations of less than 15 ppm, and additionally require the substantial removal of other environmentally proscribed contaminants, in a moderate pH environment because such highly acidic environments necessitate specialized equipment and maintenance and are not suitable or practical for neighborhood laundromats.

A recent prior art system directed to treating laundromat effluent is shown in FIG. 1 infra. FIG. 1 shows a treatment system wherein laundry effluent 10 first passes through in-frame window screens 11 to remove large particulates, as was typical of the prior art. The screened wastewater is pumped by pump 12 to a multi-media or particulate filter 13 which contained diverse particulates such as sand, anthracite coal, and garnet. The filtered water was then transferred to ion exchange resin vessels 14, with a regenerant solution holding tank 15. Effluent 16 from vessels 14 was then transferred to leaching pools (not shown). A city source cold water backwash 17 to filters 13 and 14 was used. While the FIG. 1 system provided some improved treatment of the wastewater effluent, the quality of the effluent was inconsistent and the filters 13 and 14 would readily become clogged or fouled. The FIG. 1 system was not suitable for practical, cost effective laundromat operations.

Referring to FIG. 2 there is shown a more recent prior art wastewater treatment system for laundromats. The system, in general terms, comprises a laundromat wastewater effluent line 20, bag filters 21 disposed within lint trap 22, and pump 23 operably disposed in lint trap 22 pumps the lint trap outflow to a second bag filter 24. The second bag filtered water is then pumped by pump 37 to a multi-media or particulate filter 25 to remove suspended solids. The outflow 41 from filter 25 is pumped by pump 42 to a FOG removal or absorptive filter 26 which also removes residual fine solids. The FOG removed outflow water 40 from filter 26 is treated in a strong base anion exchange resin in vessels 27 to remove MBAS. Cold water backwash 63 is provided. A regenerant solution 28 containing a biocide and/or oxidative chemical 61 is introduced at 65 to vessels 27 during an automatic intermittent cleaning process to control bacterial growth and to reduce fouling of the ion exchange resin, and the spent regenerant 55 is discharged at 64. The fully treated effluent 29 from vessels 27 is sent to leaching pools (not shown) to subsurface aquifers, surface or for reuse or subsequent purification. The laundromat wastewater effluent 20 is first treated by relatively fine mesh filter bags 21. Bags 21 are rated at 100 to 800 microns, and preferably 100 to 400 microns, with about 300 microns being most preferred. Bags 21 are mounted to each bottom orifice 32 of opposed drop tees or joints 30 with an oppositely disposed top orifice 31. Any effluent overflow, such as by an aberrant surge in flow, passes through top orifice 31 directly into trap 22. The bags 21 are operatively disposed within trap 22 so that the filtered water passes first to a turbulent flow upper level 33. The filtered water contains residual organic matter agglomerates which water then flows from the turbulent flow upper level 33 to the quiescent flow lower level 34 of trap 22, whereat the agglomerates further settle out. Overflow 45 from trap 22 is gravity fed to overflow holding tank 46 where a pump disposed in tank 46 is operatively interlocked with a float in trap 22 to pump return flow to effluent feed line or pipe 20 for a continuous even flow operation. Pump 23 pumps the first bag filtered water 36 to a second bag filter 24. Second bag filter 24 is approximately the same mesh size as first bag filter 21. In a preferred embodiment of the invention, the second bag filter 24 is somewhat coarser than the first bag filter 21. The immediately afore-described prior art systems was generally directed to and relied on multiple filtration stages wherein the wastewater first underwent gross filtration by weir, gravity and/or screen means for removal of relatively large particulates and agglomerates. This approach however caused rapid clogging and fouling of the filters, particularly the FOG absorptive filter 26, and was proven impractical and inoperable for laundromat operations. Furthermore, it was found that the linear alkyl sulfonates (LAS) typical of household detergents bonded to the strong base anion resin in an essentially irreversible manner causing ineffective wastewater treatment.

The laundromat art thus desired a method and apparatus for treating its diverse wastewater effluent in an essentially continuous operation, in a non-toxic, moderate pH environment, and with minimal maintenance and downtime, and yet importantly meet the present day stringent environmental discharge standards. The present invention provides that desired result.

SUMMARY OF INVENTION

The term "equalization" or "equalizing" as used hereinbefore and hereinafter throughout the specification and claims refers to laundromat effluent collection and retention in a large tank so as to average out the variations and permutations in the nature and concentration of effluent and to further provide a relatively consistent pH value for further treatment of the wastewater.

In broad terms, the present invention is a method and apparatus in which acidification of the effluent is at a first predetermined pH and then adding a coagulant to the wastewater at the first pH to effect a second predetermined pH for coagulation at the second pH to provide nascent treated water and a sludge. The treated water is filtered and then passed through a week base anion exchange resin to remove MBAS. The pH is finally adjusted to about neutral. The finally treated water meets the afore-discussed environmental standards.

In more specific terms, the present invention comprises a method and apparatus for the treatment of wastewater effluent from laundered household wash or a laundromat wherein the effluent is collected in a first tank for equalization for at least about ½ hour to a pH between 8.5 to 11 and then passed to a second tank for acidification to a first pH of not less than about 6.5 and preferably from about 6.5 to 6.9, and then a coagulant, preferably a polyaluminum chloride with a basicity of 45 to 50%, is added to effect a second pH of not less than about 5.0 and preferably from about 5.2 to 5.4 to coagulate at the second pH to form treated water and a sludge. The treated water is removed from the second tank, filtered to remove 1 to 50 micron particulates and passed through weak base anion exchange resin to remove MBAS. The treated water is then finally pH adjusted to about 6.5 to 8.5. This finally treated water meets the afore-discussed environmental standards for surface or sub-surface discharge, or optionally may be sanitized such as by ozonation or UV treatment for recycle as feedwater to the laundromat. Before equalization, the wastewater effluent need only be grossly filtered to remove particulates greater than about 300 microns.

In one preferred embodiment, the present invention is a combination of filer components in series, particularly including bag filters, and a weak base anion exchange resin bed to remove MBAS from the filtered wastewater.

DESCRIPTION OF THE PREFERRED EMBODIMENTS

Figure 3:
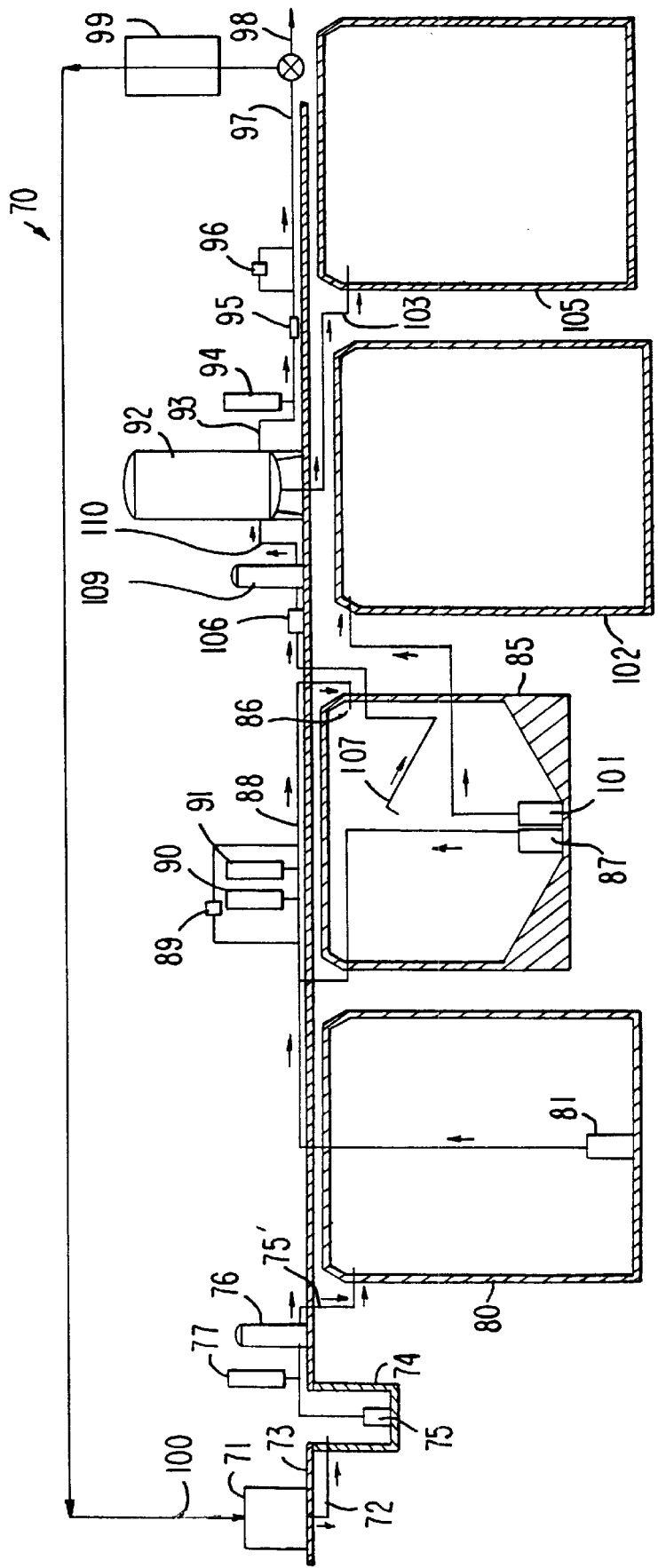
FIG. 3 is a flowsheet illustration of the wastewater treatment system of the present invention.

Referring to FIG. 3 there is shown the present invention 70. A laundromat is generally designed as 7,1 with wastewater effluent 72 being discharged from laundromat 71. The effluent discharge is between 8,000 to 35,000 gallons/day and has the following broad range of characteristics:

| | |
|---|---|
| MBAS | 35–130 ppm |
| TSS | 70–130 ppm |
| TDS | 350–775 ppm |
| Oil and grease | 30–80 ppm |
| pH | 8.5–11.0 |

The wastewater effluent gravity flows below ground level 73 to an in-ground lint trap 74. Lint trap 74 is designed to settle out or remove particles greater than 300 microns. One such suitable lint trap design is shown as trap 22 in FIG. 2. The water in trap 74 is pumped by sump pump 75 to bag filter 76 which is designed to remove particles greater than 300 microns, and may be used optionally or in conjunction with trap 74 to ensure removal of 300 micron particulates prior to further treatment. It has been found that after lint trap particulates removal, lint or like particles of less than 300 microns agglomerate to form particles greater than 300 microns, in which case the bag filter 76 may be employed in addition to trap 74. A Harmsco BBMP bag filter is preferred. A pre-acidification feed tank 77 is disposed inline to add an acidifying agent such as sulfuric acid for purposes hereinafter appearing.

The filtered water 75 from bag filter 76 or directly from lint trap 74 is transferred below ground level to in-ground equalization tank 80. Wastewater from filter 76 or trap 74 is collected and held in tank 80 so that all the wastewater including the last collected wastewater is held in tank 80 for at least the average wash cycle time which was determined to be 24.5 minutes or at least about ½ hour. It was found that this time was necessary for diverse characteristics such as detergent types, concentration, and temperature to equalize, and the entire contents of the tank would then be at a specific pH between 8.5 to 11 and at a uniform temperature. This equalization was found necessary for controlled treatment of the large and diverse effluent volumes. After equalization pump 81 transfers the equalized wastewater to batch treatment tank 85 as at inlet 86. Tank 85, like tank 80, is in-ground for insulation for operating at a more uniform temperature absent such in-ground construction.

Tank 85 is filled to a pre-determined level at which level float actuation switch (not shown) actuates pump 87 to recirculate the water through line 88. A pH sensor or controller 89, such as manufactured by Advantage Controls, Inc. and Pulsafeeder, Inc., are well known in the art. The controller 89 senses the pH and actuates acid supply or feed 90 to add an acidifying agent such as sulfuric acid to line 88. A partial or pre-acidification may optionally be used by feed 77. The acidification continues until a predetermined pH of about 6.5 to 6.9 and preferably about 6.8, is attained at which point the acid feed 90 is shut off by controller 89, and coagulant supply or feed 91 is actuated to feed an acidifying coagulant, particularly a metal-halo coagulant and preferably a polyaluminum chloride (PAC) to line 88 and then into tank 85. The coagulant is added until the pH controller sensor 89 senses a pH of about 5.2 to 5.4 which then activates shut down of the coagulant supply 91 and pump 87. The pH specific water-coagulant mixture is allowed to settle for a minimum predetermined time of at least ½ to ¾ hour, and preferably 2 to 3 hours. After the termination of the pre-set coagulation time, self-priming pump 106 is automatically actuated to decant the nascent water by float arm 107 to remove the water from the coagulated sludge and from tank 85.

The removed water is pumped to cartridge filter 109 for removal of 1 to 50 micron particulates. The cartridge filter is preferably 20 micron rated. A Harmsco HIF24 is the preferred cartridge filter. The filtered water 110 is passed through ion exchange resin tank 92 which is packed with a weak base anion exchange resin to remove MBAS. One preferred weak base anion exchange resin is WBMP resin in sulfate form manufactured by Resintech, Inc. The treated water 93 is acidic and then mixed with caustic from caustic feed 94 in in-line mixer 95. A pH sensor controller 96, such as afore-described senses the pH after mixer 95 and when the pH is 6.8 to 8.5, and preferably about 7.0, the caustic feed is shut off. This provides continuous monitoring and regulation of the pH of the treated wastewater. The treated wastewater at 97 has the following maximum criteria:

| | |
|---|---|
| MBAS | 1.0 ppm |
| TSS | 30.0 ppm |
| TDS | 1000 ppm |
| Oil and grease | 15 ppm |
| pH | 6.5–8.5 |

This treated wastewater may be pumped as at 98 directly to subsurface leaching pools (not shown) or, optionally, may be sanitized by ozone generation or ozonator 99 for recycle as feedwater 100 to laundromat 71. One suitable ozone generator for ozonation of the wash water for recycle feedwater is shown and described in U.S. Pat. No. 5,097,556, issued Mar. 24, 1994, to Engel, et al.

The ion exchange resin must periodically be cleaned. The weak base ion exchange resin is cleaned with back wash and acid (optional) to remove PAC-reactant contaminants, and then 2 to 4% caustic added and then the caustic is flushed, and 2 to 4% sulfuric acid added, and finally flushed until the pH of the wash is about 4 to 5.

After decanting the nascent water from tank 85 to effect a predetermined lover level in the tank, level switch is actuated to shut off self-priming pump 106 and simultaneously actuate sludge pump 101 to pump the sludge to sludge holding tank 102. The sludge is then further settled out and removed by septic tank handlers for off-site disposal. The waste regenerant solution 103 from ion exchange resin tank 92 is collected in tank 105 and likewise periodically removed by commercial septic tank handlers for off-site disposal.

Suitable coagulants pursuant to the present invention are generally those which further acidify the acidified wastewater to a moderate pH at which there is effective coagulation. It has been found that metal-halo coagulants and their derivatives are useful including wherein the metal is preferably Al and the halide is Cl, Br or I or mixtures thereof; and preferably Cl. The preferred metal-halo coagulants are polyaluminum chlorides (PAC), aluminum chlorohydrates, and polyDADMAC, and polymer mixtures or derivatives thereof. The most preferred coagulant is polyaluminum chloride (PAC). PAC solutions are commercially available in broad ranges of polymerization with basicities ranging from above zero up to 83%. It has been found, however, that a PAC with a basicity of 45 to 50% is most preferred. It has also been found that a PAC with extremely low sulfates or less than 100 ppm is most preferred and may prevent interference with the weak base anion exchange resin reaction. It is also most preferred that the PAC be essentially free of Fe as this will cause corrosion and discoloration, which discoloration must be avoided particularly where the treated water is recycled as laundromat feedwater. An aforedescribed most preferred PAC is commercially available from Geo Specialty Chemicals, Little Rock, Ark.

Figure 4:
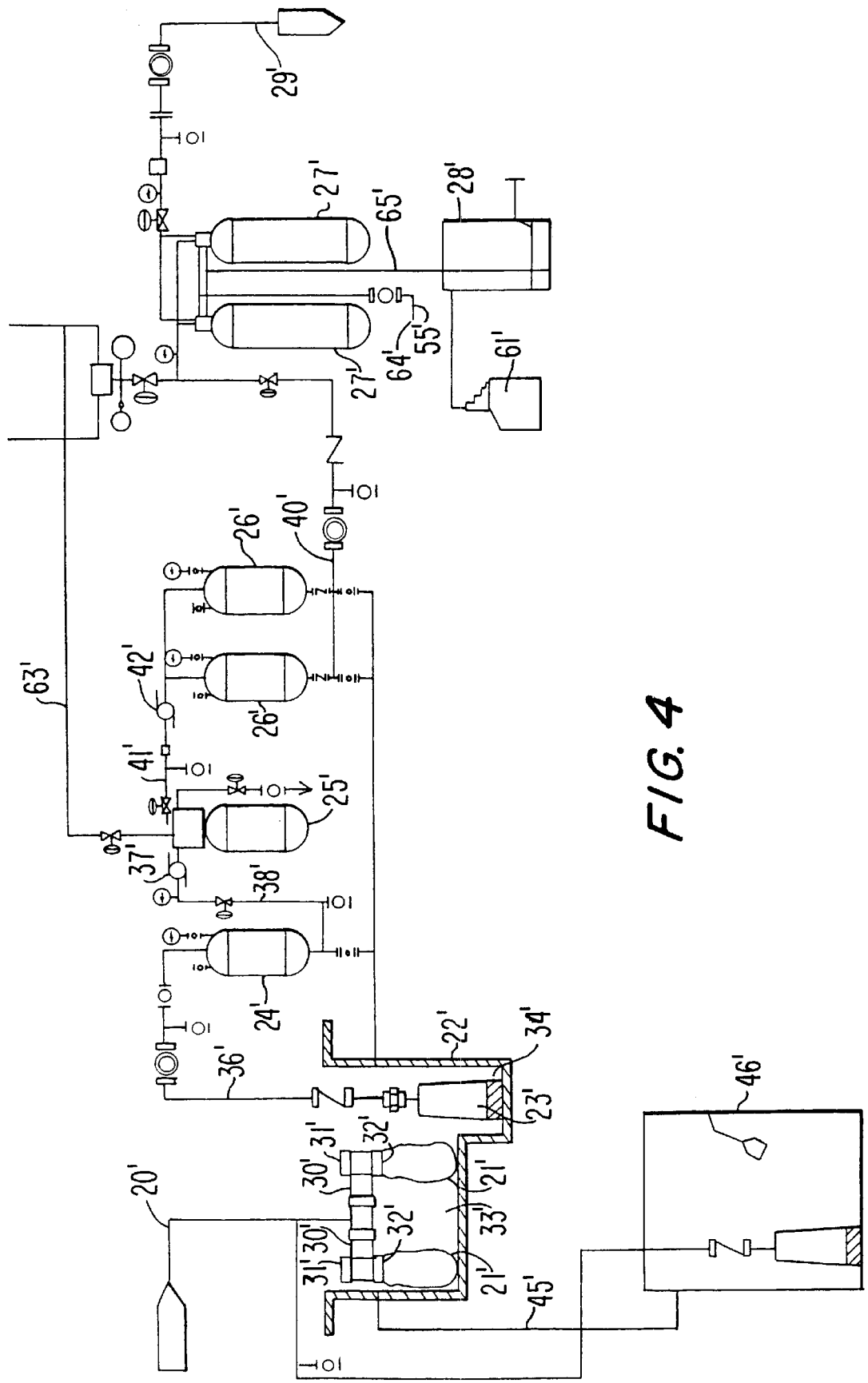
FIG. 4 is a flowsheet illustration of a further embodiment of the wastewater treatment system of the present invention.

Referring to FIG. 4, there is shown a further embodiment of the present invention. This latter embodiment comprises components or elements 20', 21', 22', 23', 24', 25', 26', 27', 28', 29', 30', 31', 32', 33', 34', 36', 37', 40', 41', 42', 45', 46', 55', 61', 63', 64' and 65' which components or elements are similar to those described in connection with the prior art FIG. 2 embodiment with one critical distinguishing feature. The FIG. 2 prior art component 27' was a strong base ion exchange. The FIG. 4 embodiment component 27' is a weak base anion exchange resin to effectively remove MBAS. This distinction is critical in that the combination of filters, particularly including first bag filters 21' and bag filters 24' and the weak base anion exchange resin 27' would provide an effective laundromat wastewater treatment system, albeit somewhat less effective than the preferred embodiment of FIG. 3.

Figure 2:
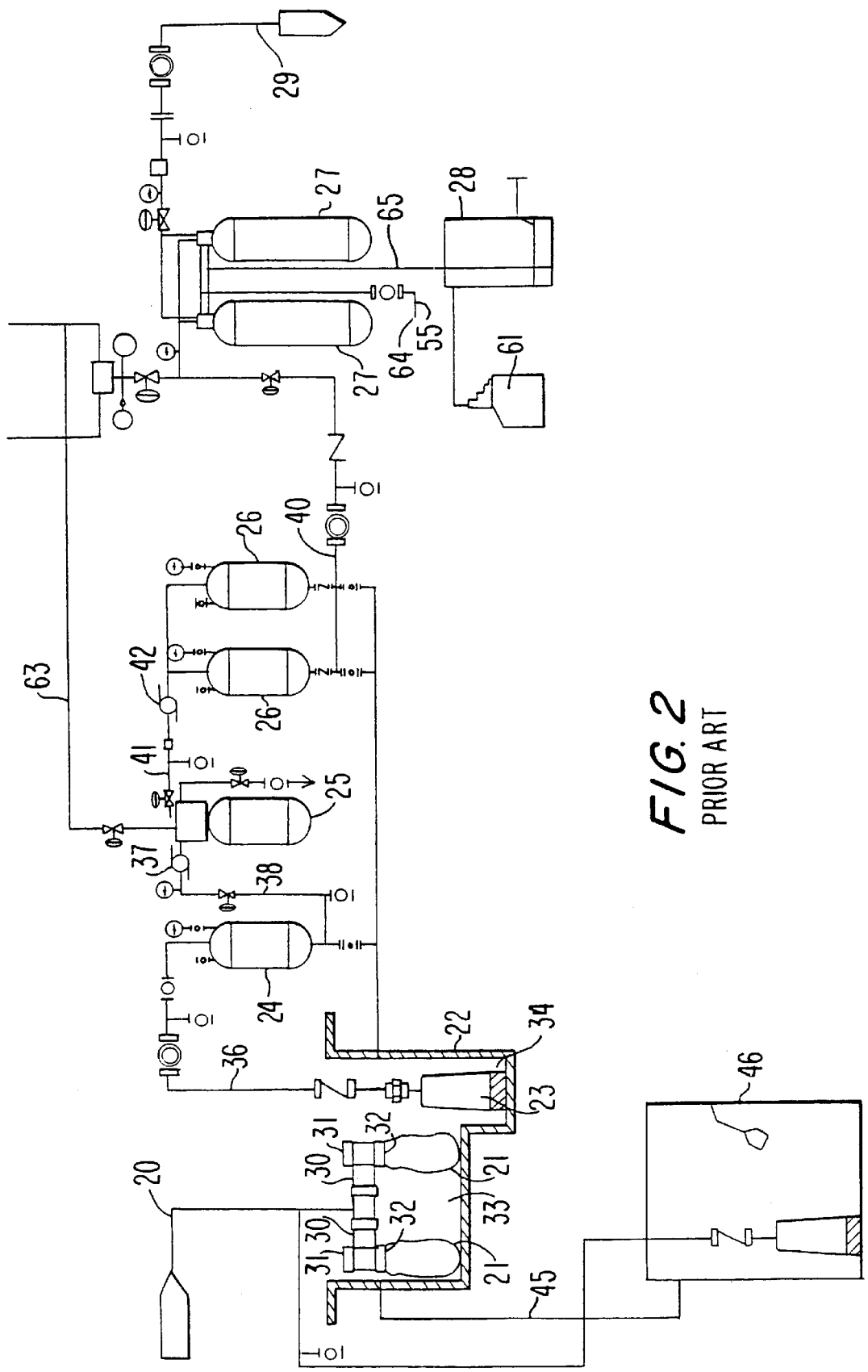
FIG. 2 is a flowsheet illustration of another prior art wastewater treatment system.

Further, prior art adsorptive filter 26' of the FIG. 2 embodiment is now optional 26' and instead may be eliminated in the FIG. 4 embodiment of the present invention.

The embodiment of FIG. 4 contemplates multiple filtering of the laundromat effluent prior to treatment in the weak base anion exchange resin. This multiple filtering contemplates at least 2 bag filters in series. One bag filtration apparatus within the contemplation of the present invention is that disclosed in Sharkey, et al., U.S. Pat. No. 5,350,526, granted Sep. 27, 1994.

Sharkey discloses multiple bag filters in series operation, albeit in a single housing.

The FIG. 4 embodiment is thus directed to multiple series filters with subsequent weak base anion exchange resin treatment.

Methylene Blue Active Substances (MBAS) are a class of compounds, more specifically synthetic anionic detergent compounds, that react to methylene dye to form a blue color. Detergents used at non-commercial laundromats (typically referred to as coin-operated laundromats as are used by residential customers) contain such detergents. The detergents are typically formulated using Linear Alkyl Sulphonates (LAS). The length of the linear chains used in producing the detergent vary in length, but are often in the range of between 8 and 15 carbon atoms in length. The sulphonate group is chemically bonded at the end of the linear alkyl chain and serves as the "active" site for the detergent.

Present day stringent environmental discharge standards require that MBAS concentrations be reduced to relatively low concentrations before being released into the environment. One such regulation can be found in 6 NYCRR, Chapter X, Part 703.6 that requires a maximum concentration of 1.0 ppm for MBAS discharge. Typical MBAS concentrations for raw non-commercial laundromat wastewater typically fall in the range of 35 ppm to 130 ppm. Due to the relatively high concentration of MBAS in the raw wastewater and the volume of wastewater generated by most coin-operated laundromats, it is necessary to provide a means of removing such significant amounts of MBAS, and that the means for removal be able to accumulate large amounts of MBAS before requiring replacement or cleaning. That is, the means for MBAS removal must have a high affinity for the MBAS so as to be able to remove most of the MBAS in the raw wastewater. Several additional concerns include ease of replacement or cleaning the means used to remove the MBAS, the cost of replacing or cleaning the means used to remove the MBAS, and the space required to operate the means used to remove the MBAS.

Figure 1:
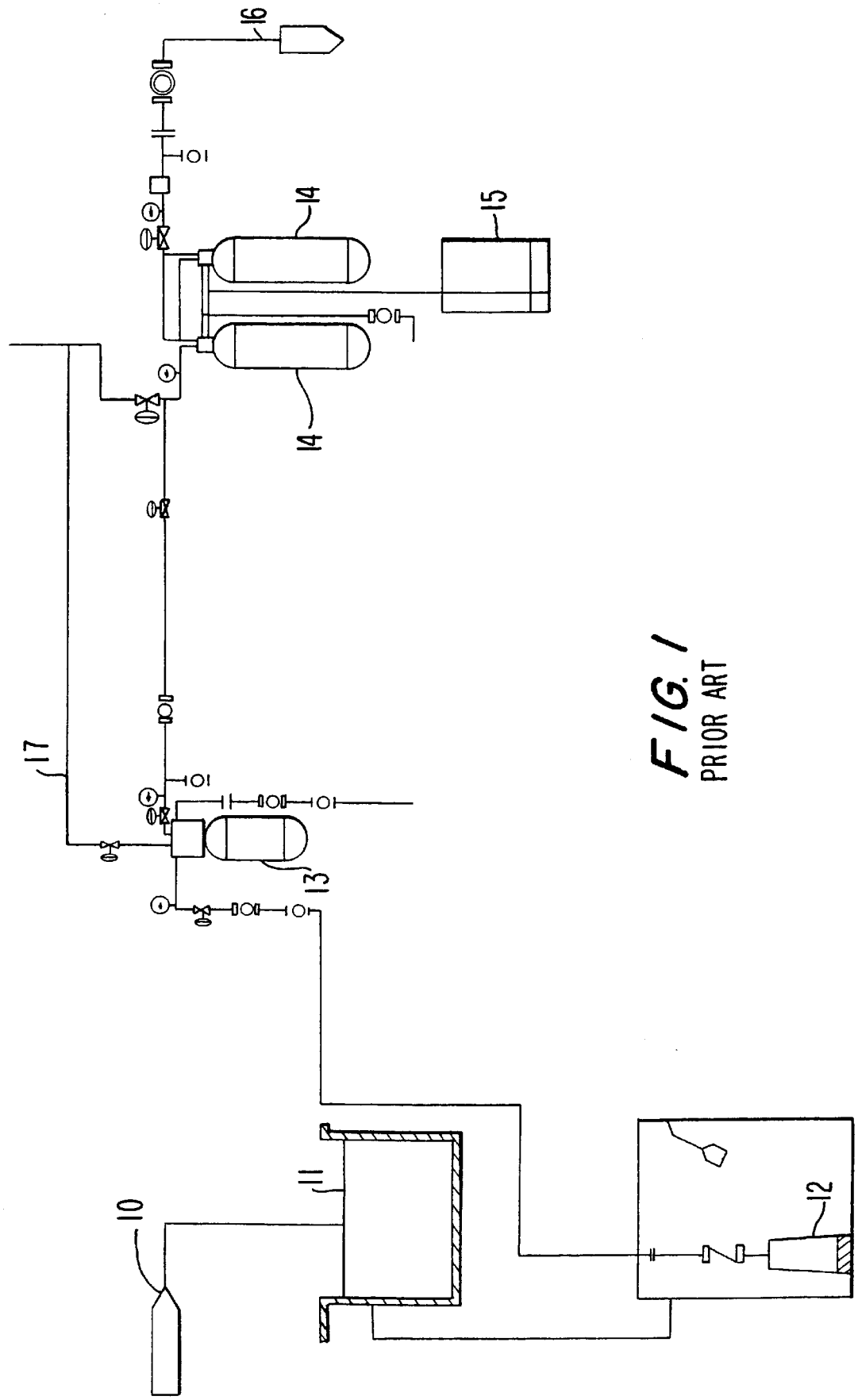
FIG. 1 is a flowsheet illustration of a prior art wastewater treatment system.

Two such prior art attempts at removing the MBAS from the wastewater are shown in FIGS. 1 and 2. In FIG. 1, activated carbon was utilized in combination with a mechanical filtration device to reduce the amount of suspended solids and MBAS. However, the filtration system depicted was incapable of meeting the present day stringent discharge standards for any appreciable amount of time. This exceedance was due to the activated carbon's limited loading capacity and limited affinity for the LAS. The prior art illustrated in FIG. 2 was directed at utilizing a filtration device in combination with a strong base anion resin. Based on field trials of this arrangement, the concentration limit of 1 ppm for MBAS was exceeded in a relatively short period of time. This exceedance was attributable to the strong anion resin's exceptionally high affinity for the LAS, and more specifically the sulphonate group, as has been described in technical literature. The strong base resin's exceptionally high affinity for the sulphonate group caused the LAS to be irreversibly absorbed onto the resin bed, and could not be effectively eluded during the resin regeneration cycle. As such, the resin was irreversibly exhausted within a few attempted regeneration cycles. The FIG. 2 approach was impractical.

The FIG. 4 embodiment of the present invention utilizes a weak base anion resin in combination with filtration to provide a cost effective means of removing a substantial amount of MBAS and suspended solids. A preferred weak base resin is commercially available in a macroporous, tertiary amine form. One such resin is "WBMP" as manufactured by Resintech, Inc. of Cherry Hill, N.J. It is typically supplied in the free base form and is incapable of splitting salts. As such, weak base anion resins do not actually exchange ions, but instead adsorb the ionic molecule as a whole. Initially the resin is put into it's operative form via regeneration. Regeneration refers to the process whereby the resin is chemically treated to remove contaminants from the resin bed and return it to it's operative form. Once in it's operative form the resin is put back into service to remove additional contaminants until such time as the resin is incapable of removing a sufficient quantity of the contaminant of concern and the discharge concentration limit is exceeded. At that time, the regeneration process is repeated, the accumulated contaminants are eluded from the resin bed and the resin bed is returned to it's operative form. The choice of the chemicals, concentrations, and contact times used for regeneration of the resin bed are important to ensure that the bed is returned to the practical best condition possible. Use of a chemical for which the resin has a low affinity as compared to the contaminant already adsorbed onto the resin beads will cause the contaminant to remain on the resin bead and will decrease the effectiveness of the ion exchange process. Macroporous weak base resin exhibits a high resistance to organic fouling and was found to have a regeneration efficiency of nearly 100%. The organic fouling resistance is particularly necessary in this application as the LAS would tend to foul other types of resin such as strong base anion resins. The high regeneration efficiency of the weak base anion resin is of particular significance in the present invention due to the high wastewater treatment volumes from a laundromat. The weak base resin, as compared to the strong base resin, has a greater ability to deadsorb MBAS and organics such as LAS. Further, the strong base resin, as compared with the weak base resin, would more readily degrade in performance with each attempted regeneration cycle, thereby reducing it's operating life.

The weak base resin "exchanges" anions based largely on ionic charge and size of the ion. Specifically, it prefers large ions over small ones. To optimize the ion exchange process, the weak base anion resin was used in the sulphate form. Use of the resin in the sulphate form is the preferred embodiment however use of the resin in an alternate, suitable form may also produce satisfactory results as the mechanism of attraction of the LAS contaminant onto the resin bed is more than related to just the sulphonate being exchanged for the sulphate as the resin also has an affinity for organic molecules such as LAS. Weak base anion resin operates in the slightly acidic range. Due to the basic nature of the coin-operated laundromat wastewater, it is necessary to adjust the pH of the wastewater entering the resin bed to less than about 6.0, but more than about 4.5 using an acidifying agent such as sulfuric acid or hydrochloric acid. The lower pH value is based upon minimizing corrosion of downstream components, handling of highly acidic wastewater, and the need to adjust the pH back to an acceptable discharge level.

The prior art, as shown in FIG. 2, utilized a series of bag filters to remove a substantial portion of the suspended solids and FOG from the wastewater stream. The adsorptive bags 26 used as part of that process for FOG removal consisted of a heavy woven, multi-layered polypropylene substrate. Due to the mesh size of the bag, i.e. approximately 10 microns, a substantial amount of suspended solids were also trapped in the bag along with the FOG. The FIG. 4 embodiment of the present invention does not necessarily have to utilize such bag filtration 26', as it was found that such bag filters clogged after relatively short process run times. Removal of the FOG components of the wastewater in the prior art was necessary as the strong base resin was susceptible to organic fouling. Use of a weak base anion resin, as shown in the FIG. 4 embodiment of the present invention, is therefore far less susceptible to organic fouling, thereby minimizing if not eliminating the need for adsorptive filters 26'.

The above-described apparatus provides a part batch treatment method which however effectively provides essentially continuous treatment and possible recycle of laundromat wastes. The continuously treated water meets the aforesaid rigorous environmental criteria for ground water discharge. The method provides an essentially continuous operation, with minimal downtime and maintenance, which maintenance is readily and simply achieved such as by regular, but infrequent filter cleaning or replacement, and sludge removal.

Since other modifications and changes varied to fit particular operating requirements and environment, it will be apparent to those skilled in the art, the invention is not considered limited to the example chosen for purposes of disclosure, and covers all changes and modifications which do not constitute departures from the spirit and scope of this invention.

It will be appreciated that modifications may be made in the system and apparatus described hereinabove in keeping within the scope of the present invention, as defined in the appended claims.

What is claimed is:

1. A method for treating wastewater from household laundry effluent comprising:
 (a) filtering the effluent to remove particulars; and
 (b) passing the filtered wastewater from step (a) through a weak base anion exchange resin to remove methylene blue active substances.

2. The method of claim 1, wherein step (a) comprises passing the effluent through a bag filter.

3. The method of claim 2, further comprising passing the effluent through bag filters.

4. The method of claim 2, further comprising (c) regenerating the resin, and removing the methylene blue active substances and linear alkyl sulphonates.

5. The method of claim 4, wherein the weak base anion exchange resin is a macroporous resin.

6. The method of claim 5, wherein the treated wastewater from step (b) is acidic.

7. The method of claim 6, further comprising adding caustic to the treated wastewater from step (b).

8. The method of claim 1, wherein the filtering is free of adsorptive filtering.

9. The method of claim 8, wherein step (a) comprises passing the effluent through a bag filter.

10. In combination;
 (a) bag filter means for removing particulars from the wastewater effluent from household laundry said bag filter means comprises 2 bag filters; and
 (b) weak base anion exchange resin means for removing methylene blue active substances from bag filtered water.

11. The combination of claim 10, further comprising (c) means for regenerating the weak base anion exchange resin.

12. The combination of claim 10, further comprising filter means for removing fine particulates from the bag filtered wastewater prior to removing the methylene blue active substances.

13. The combination of claim 12, said weak base anion exchange resin means comprising sulfate form resin.

14. The combination of claim 13, further comprising (c) means for adding caustic to the treated wastewater from the weak base anion exchange resin means.

\* \* \* \* \*